Figure 1:
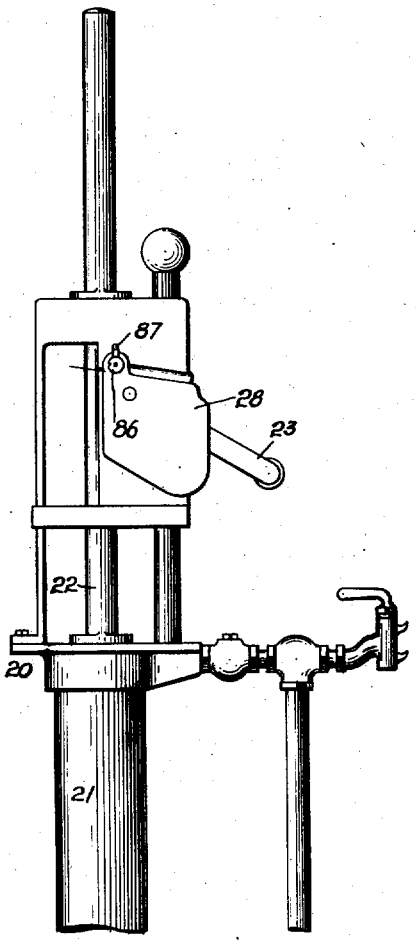

C. S. BATDORF.

DISPENSING AND RECORDING APPARATUS.

APPLICATION FILED JULY 13, 1917.

Reissued Jan. 14, 1919.

14,586.

4 SHEETS—SHEET 1.

Charles S. Batdorf

INVENTOR.

BY W. B. Whitney

ATTORNEY

C. S. BATDORF.

DISPENSING AND RECORDING APPARATUS.

APPLICATION FILED JULY 13, 1917.

Reissued Jan. 14, 1919.

14,586.

4 SHEETS—SHEET 2.

Charles S. Batdorf

INVENTOR.

BY W. B. Whitney

ATTORNEY

C. S. BATDORF.

DISPENSING AND RECORDING APPARATUS.

APPLICATION FILED JULY 13, 1917.

Reissued Jan. 14, 1919.

14,586.

4 SHEETS—SHEET 3.

Charles S. Batdorf

INVENTOR.

BY Wm. B. Whitney

ATTORNEY

C. S. BATDORF.

DISPENSING AND RECORDING APPARATUS.

APPLICATION FILED JULY 13, 1917.

Reissued Jan. 14, 1919.

14,586.

4 SHEETS—SHEET 4.

Charles S. Batdorf

INVENTOR.

BY J. B. Whitney

ATTORNEY

UNITED STATES PATENT OFFICE.

CHARLES S. BATDORF, OF BROOKLYN, NEW YORK, ASSIGNOR TO STANDARD LIQUID RECORDING COMPANY.

DISPENSING AND RECORDING APPARATUS.

14,586. Specification of Reissued Letters Patent. Reissued Jan. 14, 1919.

Original No. 1,204,393, dated November 14, 1916, Serial No. 62,482, filed November 20, 1915. Application for reissue filed July 13, 1917. Serial No. 180,444.

*To all whom it may concern:*

Be it known that I, CHARLES S. BATDORF, a citizen of the United States, and a resident of Brooklyn, in the county of Kings and State of New York, have invented certain new and useful Improvements in Dispensing and Recording Apparatus, of which the following is a specification.

The invention pertains more particularly to apparatus by means of which predetermined quantities of a liquid may be discharged from one container to another or from a reservoir owned by a dealer into a tank or other receptacle owned by a customer or purchaser, or into a tank or receptacle to be emptied into a tank or receptacle owned by a purchaser.

The invention is intended more particularly, though not exclusively, for the use of garages and dealers who supply, as a part of the business transacted, predetermined quantities of gasolene and oil to owners of automobiles, and one purpose of the invention is to provide suitable means whereby in the sale of gasolene or other liquid, both the dealer and purchaser may have a positive assurance that the predetermined quantity of the liquid purchased has been delivered, and also whereby in the sale and delivery of the gasolene or other liquid the dealer, having possibly a number of employees, may ascertain who sold the gasolene and also the quantity sold and delivered.

At the present time the owners of garages and places where gasolene is supplied to owners of automobiles, have means for delivering predetermined quantities of gasolene to owners of automobiles, but these means are subject to the intelligence, will and faithfulness, as well as the carelessness of employees, and it frequently happens that a person purchasing, say, three gallons of gasolene will not receive that quantity, but sometimes, due to carelessness or other reason, either less or more than that quantity.

My invention provides a duplicate record by means to be automatically operated from the dispensing mechanism, of the quantity of gasolene or other liquid delivered to a customer or purchaser, one copy of the record being reeled up within a closed casing connected with the dispensing apparatus and the other record being made on a strip of paper unwound from a reel and delivered from without the casing so that the end of the strip bearing the record may be detached as a check and handed to the purchaser, the record within the casing and the check given to the customer showing whether or not the proper quantity of gasolene ordered has been delivered and also a notation identifying the employee who operated the dispensing mechanism. The casing containing the record reels of paper will be locked and the whole apparatus will be rendered inoperative, except upon the insertion of a proper key rendering the mechanism operative. The keys will vary for the different operatives or employees and so set the mechanism as to render it operative and to enable the recording devices to indicate on the record strips the employee who inserted the key into the casing of the recording mechanism and delivered the gasolene.

My invention may be applied to various kinds of dispensing apparatus for coöperation therewith, and in the present instance I have presented my invention as connected with the operating shaft of a pump of known character and not in itself possessing any features of novelty.

Figure 2:
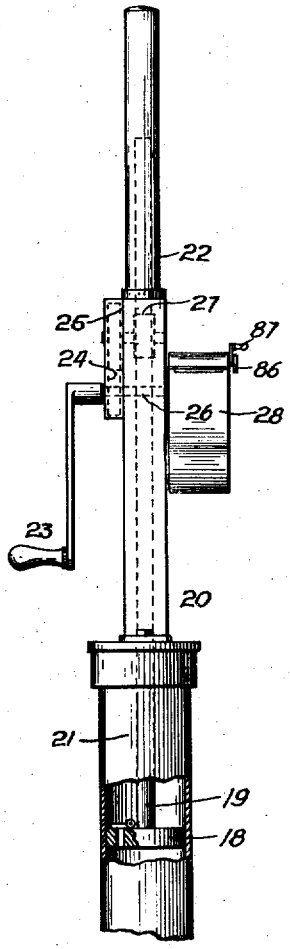
Figure 3:
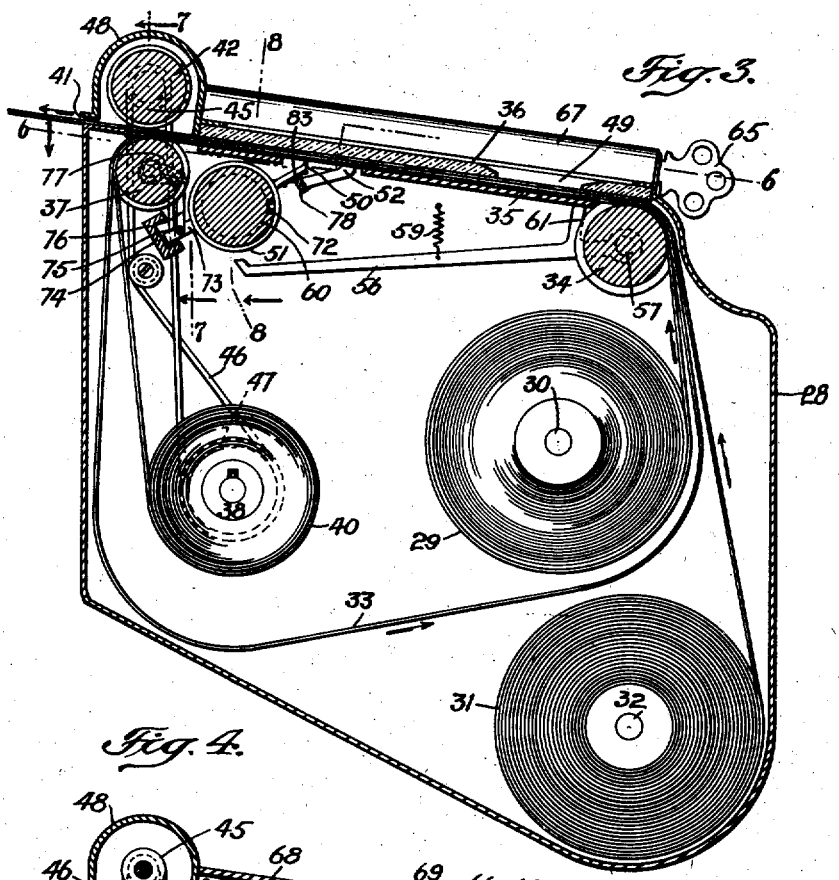
Figure 4:
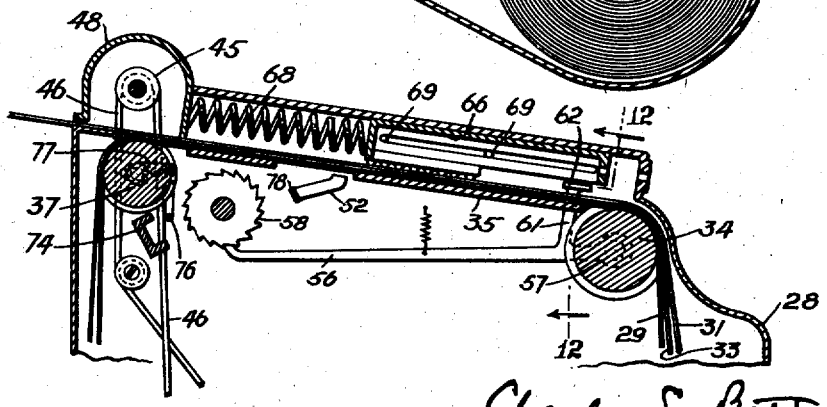
Figure 5:
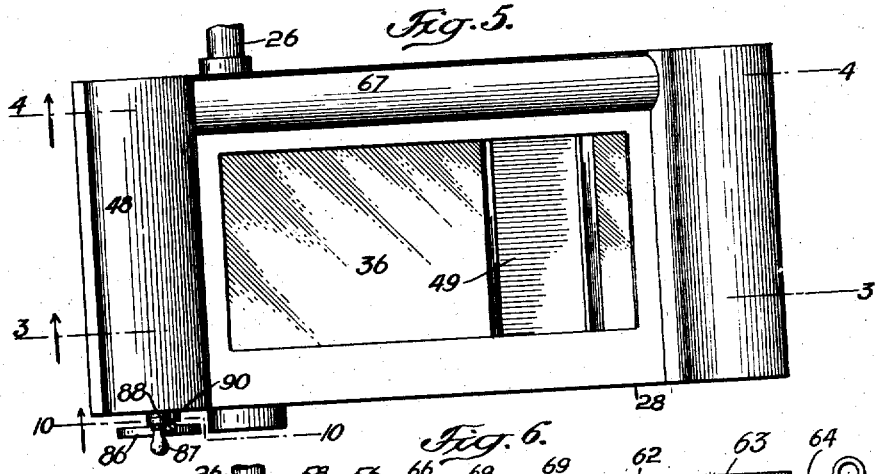
Figure 6:
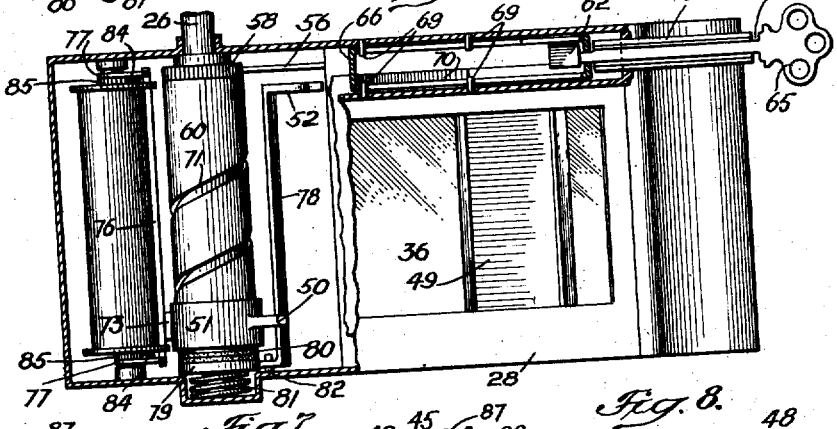
Figure 7:
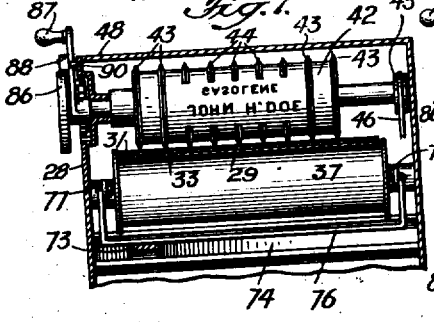
Figure 8:
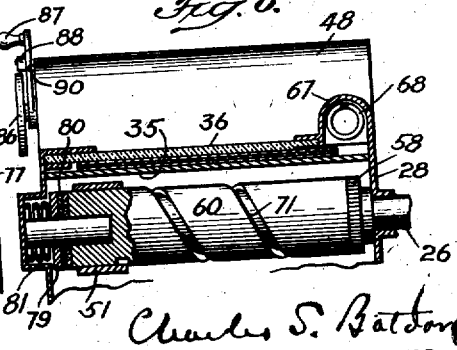
Figure 9:
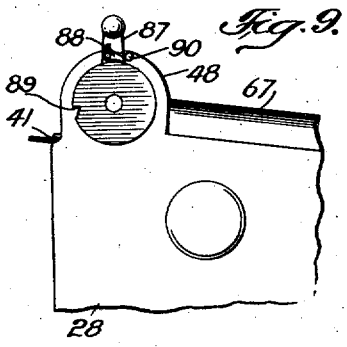
Figure 10:
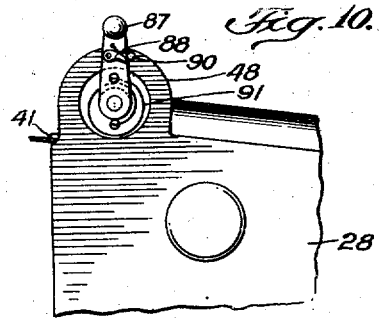
Figure 11:
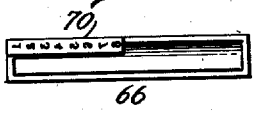
Figure 12:
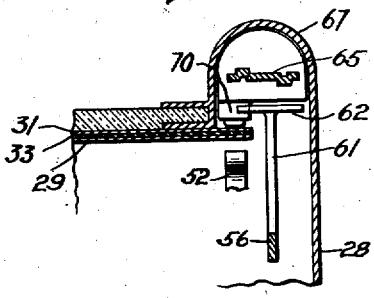
Figure 13:
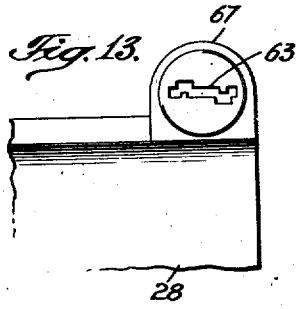
Figure 14:
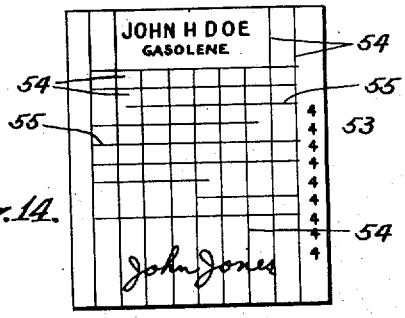

The invention will be fully understood from the detailed description hereinafter presented, reference being had to the accompanying drawing, in which:

Figure 1 is an elevation, partly broken away, of a dispensing apparatus having applied thereto the features constituting the present invention; Fig. 2 is an edge view, partly broken away and partly in section, of the same; Fig. 3 is a vertical section through the apparatus of my invention, taken on the dotted line 3—3 of Fig. 5, the mechanism being shown in its normal inoperative position; Fig. 4 is a corresponding section through the upper portion of the mechanism of my invention taken on the dotted line 4—4 of Fig. 5; Fig. 5 is a top view of the same; Fig. 6 is a horizontal section, on the dotted line 6—6 of Fig. 3, of a portion of the same and illustrates the manner of applying a key to the mechanism for rendering the same operative, the key being shown as having been partly applied but not pushed all the way home; Fig. 7 is a vertical transverse section through a portion of the same, taken on the dotted line 7—7 of Fig. 3; Fig. 8 is a like section through a portion of the mechanism taken on the dotted line 8—8 of Fig. 3; Fig. 9 is a side elevation of a portion of the mechanism of my invention, Fig. 8 having been taken from the lower side of Fig. 5; Fig. 10 is a like view with the notched disk shown in Fig. 9 omitted, Fig. 10 having been taken on the dotted line 10—10 of Fig. 5; Fig. 11 is a detached bottom view of a slidable type carrying member to be set into proper position for making impressions on the record strips by means of the key to be applied to the mechanism for rendering the same operative; Fig. 12 is a vertical section through a portion of the machine taken on the dotted line 12—12 of Fig. 4; Fig. 13 is a front elevation of a portion of the machine and illustrates the key-receiving hole or slot, and Fig. 14 is a face view of one of the checks discharged by the machine to indicate whether the employee made a proper delivery of the gasolene, and this check by the incomplete transverse lines denotes that the proper quantity of gasolene had not been delivered and that the employee did not on operating the handle for the pump make complete turns of said handle.

In the drawings, 20 denotes a known type of pump or dispensing mechanism and therefore not requiring special detailed explanation herein.

21 designates the pump cylinder, 22 a tubular casing inclosing the pump rod, and 23, the crank-handle for operating the pump; 24, 25, 27, denote respectively, the gear wheels for operating the pump rod 19 from the said crank-handle, and 26 indicates the operating shaft on which said wheel 24 and the crank-handle are secured. The gear wheels 25 and 27 are secured on the same shaft and the gear wheel 27 is in mesh with the upper rack portion of the pump rod 19, on whose lower end is secured the usual valved piston 18.

It is to be understood that in the operation of the pump the crank-handle 23 must be turned in one direction for the purpose of discharging a predetermined quantity of gasolene from the pump and that finally said crank-handle must be given a sufficient reverse rotation for returning the piston 18 to its initial position preparatory to the further discharge of gasolene from the pump. The quantity of gasolene discharged from the pump will depend upon the capacity of the pump cylinder and the stroke of the piston therein, and the recording mechanism of my invention permits the discharge of any predetermined quantity of gasolene and makes a record thereof.

The mechanism of my invention is confined within a casing 28 secured upon one side of the frame of the pump and said mechanism is connected with and operable from the driving shaft 26 of the pump. The casing 28 may be of any suitable outline, and within said casing I provide a reel of paper 29 on a spindle 30, a reel of paper 31 on a spindle 32 and an endless inked ribbon 33 which travels between the strips of paper 29, 31. The strip of paper 29 during the operation of the machine is carried upwardly over a roller 34, then above a plate 35 and below a glass plate 36 and thence over a roller 37 and is finally rewound upon a spindle 38 into a reel 40 as a permanent record of the sales transactions for the owner of the machine. The inked ribbon 33 is endless and travels upon the strip of paper 29 and over the rollers 34, 37, being superposed upon the strip of paper 29 between the plate 35 and plate 36. The strip of paper 31 travels upwardly upon the inked ribbon 33, being superposed thereupon while traveling over the rollers 34, 37 and between the plates 35, 36, and said strip of paper 31 finally emerges from the machine through a slot 41 provided therein; a variable length of said strip 31 automatically emerging from the machine on and in accordance with each separate sales transaction, and a further length of said strip being, when required, discharged from the machine by the means hereinafter described, to complete a predetermined length of strip for a check of the character shown in Fig. 14 bearing thereon a notation indicating the salesman and other notations disclosing whether or not the purchaser had received the quantity of gasolene ordered.

Above the roller 37 is a feed roller 42 having ribs 43, 44 which bear against the three ply of paper and ribbon on the roller 37 and aid in effecting the travel of the paper and ribbon, and also cause the ribbon to form the definitely spaced longitudinal lines found on the check shown in Fig. 14. The roller 42 may also be provided with type, as shown in Fig 7, for effecting the printing on the strips passing through the machine of the name of the proprietor of the garage or other data. The roller 42 is driven by its frictional engagement with the roller 37 and traveling strips thereupon and the shaft of said roller 42 is provided with a pulley wheel 45 which is connected by a belt 46 with a pulley wheel 47 mounted on the shaft of the spindle 38. The rotary motion of the roller 42 is thus communicated to the pulley-wheel of the spindle 38 to reel up the strip of paper 29 during the operation of the machine, the paper 29 reeling up on the spindle 38 and the strip 31 being projected through the slot 41 between the casing 28 and a supplemental casing 48 mounted over the roller 42 and constituting a portion of the general casing of the machine. The strip of paper 31 will preferably be transparent so that any printing placed on the lower side thereof during the travel of the strip through the machine may be read as a positive due to the transparency of the paper. The paper 31 will be printed against its underside, thereby producing a negative, but due to the fact that the paper is transparent, the printing may be read from the obverse side thereof.

The glass plate 36 has an opening 49 therein, and through this opening either the purchaser will write his name on the strip of paper 31 at the beginning of the transaction or the salesman may write his name, the name appearing at the inner end of the check or strip of predetermined length to be discharged from the machine, and therefore preferably appearing at the lower end of the check, as shown in Fig. 14. The check to be discharged from the machine at each transaction thereof will probably be about six inches in length, and this length of strip will be discharged in connection with each sale transaction regardless of the quantity of gasolene or other liquid purchased or delivered. With reference to the check shown in Fig. 14, the vertical lines found thereon were made by the pressure of the ribs 43, 44 against the two strips of paper and the interposed inked ribbon, and the transverse lines present on said check were produced by a stylus 50 carried by a traveling band 51. The numerals present on the edge of the check is the special indication number or character of the salesman who operated the machine on the occasion of the sale represented by the check, and these numerals 4 were impressed on the check due to the pressure of a platen 52 against the lower surface of the strip 29 during the travel of the paper strips and ribbon through the machine. The longitudinal lines on the check, which I will number 53, are designated by the numeral 54 and the transverse lines on said check cross the longitudinal lines 54 and are numbered 55. The spaces between the longitudinal lines 54 represent predetermined measures of gasolene or the like, and the transverse lines 55 disclose whether or not a customer has received the proper quantity of gasolene ordered. The lines 55 show when they extend entirely across between the outside lines 54, as at the two upper lines now shown in Fig. 14, that the operator of the pump made a full stroke of the crank handle 23 in one direction for discharging and a full return stroke to the left hand line 54 preparatory to a further stroke in the discharging direction. The third transverse line shown on the check in Fig. 14 discloses that the operator of the pump did not make a full return stroke, but stopped before reaching the outer longitudinal line 54 and then started in on the discharge stroke, thus not delivering to the purchaser that quantity of gasolene represented between the two left hand longitudinal lines 54 and the second left hand longitudinal line 54 and the beginning of the transverse line 55. The fourth transverse line shown at the upper portion of the check 53 indicates that the operator began to operate the crank handle 23 at the beginning of the proper stroke for discharging, but stopped operating the crank handle before the stylus had traveled entirely across the check leaving, if a gallon of gasolene had been ordered, the discharge short. The spaces between the longitudinal lines 54 may vary with the capacity of the machine and the desire of the manufacturer or user, but in this instance I have provided nine of the longitudinal lines so that eight spaces may be formed between them and with each space representing a pint of gasolene. The line 55 for a gallon of gasolene will extend entirely across between the outer vertical lines 54, and therefore if a gallon of gasolene should be required, the operator will turn the crank handle 23 until the stylus 50 has traveled far enough to cross four spaces between the lines 54 and then he should return by reverse movement of the crank handle 23, the stylus to the outer left hand line 54. The stylus or marker 50 only records on the paper strips when moving in one direction, and in the construction presented said stylus or marker is effective to make the record only when it is traveling from the left to the right (looking at Fig. 14), said stylus or marker being in a lower inoperative position when traveling from the right to the left.

I will now more particularly describe the means for making the impressions on the strips of paper 31, 29. Primarily the machine is locked against movement by means of a dog arm 56 (Figs. 4 and 6) which is pivotally secured, as at 57, on the shaft of the roller 34 and has its engaging end normally held against a ratchet wheel 58 by means of a spring 59. The ratchet wheel 58 is on the shaft 26 which is the pump shaft and also the shaft for the spirally grooved roller 60. When the arm 56 is in engagement with the ratchet wheel 58, the crank handle 23 is locked, against rotation, except that it may be reversed for restoring the stylus 50 to the position in which it is shown in Fig. 6 preparatory to the commencement of operating the mechanism for the discharge of a quantity of gasolene. The arm 56 carries an upwardly extending arm 61 having at its upper end a plate 62. When it is desired to release the dog arm 56 from the ratchet wheel 58 a proper key must be inserted through the key slot 63 and then given a quarter turn so as to carry its edge against the plate 62 and thereby effect the depression of the dog arm 56 from the ratchet wheel 58. It is of course important that the release of the arm 56 from the wheel 58 may only be effected by a key in the hands of an authorized person. It is also important that in the operation of the machine the person applying the key should be identified by the printing on the check to be discharged from the machine. In this instance I provide grooved and ribbed keys adapted to the regular key slot 63, each salesman having his own special key and all capable of being inserted into the slot 63, as shown in Fig. 6, and incapable of being turned to release the arm 56 until the key has been driven entirely home and the groove 64 thereon has passed through the outer shell of that portion of the casing carrying the slot 63. When a key has been driven entirely home and then given a quarter turn it will move against the plate 62 and depress the dog arm 56. The keys, one of which I will number 65, will vary in length so that when inserted through the key slot 63 said keys at their inner ends will move against a slidable type carrying member 66 and push the same inwardly until the numeral thereon applicable to the salesman inserting the key may pass to a position directly above the platen 52, where said type carrying member will be held by the key inserted. For instance, if the salesman is known by the designation 4, his key will be of such length that, when pushed home through the key slot, the type carrying member 66 will be driven inwardly until the numeral 4 thereon is directly above the platen 52. The salesman known as number 4 cannot operate the machine and cannot turn his key against the plate 62 for releasing the dog 56 until said key has been thrust entirely home so as to be capable of being turned, and when his key has thus been inserted, the type carrying member 66 is thereby moved to its proper position for correct operation. The key 65 thus serves to unlock the machine for operation and at the same time to cause the proper notation by which the salesman is known to become impressed on the strips of paper 29, 31 during the operation of the machine. The type carrying member 66 is of semi-tubular outline and mounted within a correspondingly shaped portion 67 built along the right hand side of the casing 28, and within said portion of the casing 67 is located a coiled spring 68 which exerts a pressure against the inner end of the type carrying member 66, said spring normally retaining the member 66 in near relation to the key slot 63 and over the plate 62 connected with the locking dog arm. The type carrying member 66 has opposite sides which are slotted and the casing member 67 has transverse pins 69 (Fig. 4) which extend through said slots and coöperate therewith in guiding the member 66 in its longitudinal movements and also in preventing said member from turning angularly, should there be any disposition for it so to do. The member 66 along the inner portion of one of its sides carries a plate 70 having a series of numerals thereon in shape of type. The numerals are merely arbitrary characters and they may be replaced by any other series of arbitrary characters serving to impress on the strips of paper passing through the machine a notation indicating the salesman or other person who inserted the key 65 through the slot 63. The formation of the key in transverse sections forms one of the safeguards against the unlawful use of the machine and the varying lengths of the keys for the various salesmen creates another safeguard against the unlawful use of the machine, since, for instance, salesman number 4 having a key number 4 cannot insert his key through the slot 63 to a sufficient extent to be capable of being turned against the plate 62 without at the same time moving the type carrying member 66 to indicate by the numeral 4 thereon the person who operated the machine. Thus it may be understood that to set the machine or apparatus for operation, a proper key 65 must be introduced through the key slot 63 and then turned against the plate 62, the insertion of the proper key at the same time setting the type carrying member 66. The operating crank 23, the shaft 26 having been released, may be rotated to discharge gasolene from the pump, and during this rotation of said crank arm the shaft 26 and spirally grooved roller 60 carried thereby will be rotated. The roller 60 has the spiral groove 71 and upon said roller 60 is mounted the band 51 hereinbefore referred to carrying the stylus 50.

The band 51 has a stud 72 at its inner side and this stud is within and adapted to travel along the spiral groove 71. The band 51 is also formed with a rearwardly extending arm 73 which lies within the space between the flanges of a channel bar 74 extending transversely of the machine, and this arm 73 has in its upper surface a transverse groove 75 which receives the lower transverse member of a U-shaped link 76, the upper ends of whose sides are pivotally connected with crank arms 77. When the machine is operating to discharge gasolene, the arm 73 is against the lower flange of the channel bar 74 and the stylus 50 is in engagement with the lower surface of the strip of paper 29 and guiding upon the transverse bar 78 carrying at its right hand end the platen 52. The bar 78 extends transversely of the machine and has at its left hand end a disk 79 mounted on the shaft of the grooved roller 60, and between the disk 79 and the end of the roller 60, there is a friction washer 80, while at the outer side of said disk 79 there is a spring 81 pressing against it and frictionally engaging the same with the washer 80. The bar 78 may have a movement on the shaft of the roller 60 without said roller being rotated, and when the roller 60 is rotated it effects a limited movement of the bar 78 toward or from the stylus 50. The bar 78 is prevented from moving downwardly to any undue extent by means of a stop pin 82 (Fig. 6), and said bar 78 is prevented from moving upwardly to any undue extent by means of the stylus arm 50 and the fact that the arm 73 carried by the band 51 is against the lower flange of the channel bar 74. During the operation of the shaft 26 and roller 60 the spiral groove 71 will effect through the band 51 the transverse travel of the stylus 50 against the bar 78 and the lower surface of the strip of paper 29, said stylus during this movement effecting the impression of one of the transverse lines 55 on the two strips of paper. It is desirable that the stylus 50 should have a yielding pressure against the strip of paper 29 during the discharging operation of the pump, and hence I provide on the lower side of said stylus a light leaf spring 83 (Fig. 3) which is engaged by the transverse bar 78.

Should a purchaser desire to receive say, with the present rulings on the check 53, a full gallon of oil or gasolene, the operator would continue the rotation of the crank 23 and shaft 26 until the stylus had traveled from the left hand longitudinal line 54 to the right hand longitudinal line 54, thus making a complete single operation of the machine, and if the customer desired an additional gallon the operation would reverse the motion of the crank arm 23 and shaft 26 so as to restore the stylus 50 to its initial position at the left hand side of the machine preparatory to making an additional transverse line on the strips of paper. A reversal of the operation of the crank 23 and shaft 26 will result in the spiral groove 71 causing the sleeve 51 to travel back to its initial position shown in Fig. 6. This reverse movement of the roller 60 will result immediately on the starting of such movement, in the stylus turning downwardly against the arm 78 and in thereby freeing itself from the strip of paper and also freeing the platen 52 from the strip of paper, preparatory to the next discharging action of the crank handle 23 and the bringing of the succeeding surface of the strip of paper in position to be acted on by the stylus and platen. When the machine was first operated to discharge the gallon of gasolene, the stylus made the first transverse line 55 on the strips of paper and when at the commencement of this operation the platen 52 was moved upwardly, it pressed the three ply strips against the proper type on the type carrying member 66, in this instance being the numeral 4.

The turning downwardly of the stylus 50 on the reverse movement of the shaft 60 effected the further important matter of causing the arm 73 on the band 51 to turn upwardly against the horizontal member of the loop 76 and in moving said loop upwardly to the extent permitted by the upper flange of the channel bar 74. The upward movement of the loop 76 caused the crank arms 77 to carry their pawls 84 against the teeth of the ratchet wheels 85 fastened on the shaft of the roller 37 for the purpose of imparting a partial rotation to the roller 37 sufficient for the spacing between the horizontal lines on the check shown in Fig. 14. The roller 37 has an intermittent rotary motion and coöperates with the roller 42 in feeding the strips of paper and the strip of ribbon along. The strips have no traveling motion during the transverse travel of the stylus 50 to make a line, but upon the reversal of the motion of the crank handle 23 to return the stylus 50 to its proper position to commence making a line on the strips, said stylus is at once turned downwardly due to the frictional engagement of its stud 72 in the spiral groove 71, and upon the turning of the stylus downwardly it presses the bar 78 downwardly and the arm 73 connected with the stylus band 51 moves the loop 76 upwardly to effect the intermittent rotation of the roller 37 required for feeding a limited length of the paper onwardly preparatory to another line being formed thereon by the stylus 50. The downward turning of the stylus 50 against the bar 78 effects the depression of the platen 52, since the bar 78 is only held by a frictional engagement against the left hand end of the roller 60, which is overcome by the power exerted against the stylus by the engagement of the walls of the groove 71 with the stud 72 connected with the stylus. This frictional engagement due to the washers 80 and spring 81 not only permits the stylus 50 to depress the bar 78 at the proper time, but is sufficient when the stylus again turns upwardly and the roller 60 is rotated, to cause said bar 78 to turn upwardly and permit the platen 52 to make its impression against the strips in line with the proper numeral on the type carrying member 66. The stylus or marker 50 only records when moving in one direction, or toward the right in the construction presented herein, and this is during the turning of the crank-handle 23 to effect the discharge of the oil, gasolene, or other liquid. When the crank-handle 23 is reversed in motion, the stylus or marker 50 and bar 78 are at once turned downwardly to inoperative position, and during the reverse motion of said crank-handle the stylus or marker travels toward the left while remaining in its lower inoperative position. Whenever the crank-handle 23 is arrested during its reverse motion, whether at the end of its proper reverse operation or in advance of that point, and when set in motion to operate the pump, the stylus 50 and bar 78 will at once turn upwardly to operative position and the stylus 50 will travel toward the right and make its recording line commencing at any point at which it was stopped during the said reverse motion of the crank-handle 23. The third from the top transverse recording line 55 in Fig. 14, indicates the character of record which will be made by the stylus 50 when the crank-handle 23 is started in motion to effect the discharge of the liquid before having completed its full reverse rotation.

The crank handle 23 will be rotated first in one direction to effect the discharge of the gasolene and then in the reverse direction to restore the stylus 50 and platen 52 to their initial positions and also to effect through the loop 76, crank arms 77 and ratchet wheels 85 the feeding forwardly of a definite length of the strips of paper, with the ribbon 33. This operation will continue until the sale transaction has been completed and at that time if the predetermined length of check has not been discharged from the machine through the slot 41, the salesman in order to complete the discharge of the check will by the means provided therefor complete such discharge, these means comprising a disk 86 secured on an exposed end of the shaft of the roller 42 and a crank arm 87 provided with a spring pawl 88 swiveled on the end of said shaft and adapted to be swung around said disk 86. The disk 86 is formed with a recess 89 adapted to receive the point of the pawl 88. In the initial condition of the machine the crank arm 87 is backed against a stop 90 and the disk 86 is in such position that its notch 89 faces upwardly and is engaged by the pawl 88. During the rotation of the roller 42 in the operation of the machine said notch travels downwardly toward the front and leaves the pawl 88. In Fig. 9 I illustrate the disk 86 as having made about a three-quarter turn and as having carried its recess 89 to a position where it faces rearwardly, the crank arm 87 remaining in its initial position. If we assume that about three-fourths of the length of strip for a check has been, during the sales transaction, fed from the machine, the disk will be about in the position shown in Fig. 9, and then when it is desired to discharge the then remaining portion of the strip to constitute the complete check, the salesman will swing the crank arm 87 rearwardly until the pawl 88 enters the recess 89 of the disk 86 and then draw said crank arm 87 upwardly to its initial position against the stop 90, said arm 87 during this operation restoring the disk 86 to its initial position and causing the roller 42 to feed out the remaining portion of the strip 31 for a check, which is then torn from the body of the strip of paper against the lip at the slot 41. At the conclusion of the sales transaction the operator will also remove his key from the key slot 63 so that the spring 59 may restore the locking bar 56 to engagement with the ratchet wheel 58 and thus render the machine inoperative until a key of proper character has been again introduced into the machine. The next salesman to use the machine may be designated by the numeral 6 and if so his key would be of sufficient length when introduced through the key slot 63 to push the type carrying member 66 into such position that the numeral 6 thereon would appear above the platen 52, so that on the subsequent operation by such salesman his number would appear along the edge of the check finally discharged from the machine.

When the machine is in an inoperative condition or even when operative and the full length of check has been discharged, the crank 87 is held against its stop pin 90 by means of a spring 91 concealed behind the disk 86 and at this time the disk 86 is held in its normal condition with the recess or notch 89 facing upwardly and engaged by the pawl 88. When the machine is again set in operation for discharging gasolene, the disk 86 may ride away from said pawl 88 during the rotation of the roller 42. The spring 91 is shown in Fig. 10 and said spring is at one end connected with the crank 87 and at its other end to a stationary part of the machine.

The operation of the mechanism of my invention will be understood from the foregoing description without special further detailed explanation. The reels of paper having been mounted within the casing 28 and one end of the paper strip 29 having been fed through the space between the plate 35 and glass 36 and caught on the spindle 38 and the end of the strip of paper 31 having been extended between said plates and the rollers 37, 42, with the ribbon 33 in place, the machine is ready for operation from the driving shaft 26 of the pump. My said mechanism is however inoperative until the salesman or person to operate the machine has inserted the proper key through the key slot 63 and set the type carrying member 66 and depressed the dog arm 56 from the ratchet wheel 58. After the proper key has been introduced, the machine is ready for use and on the discharging stroke of the crank 23, the stylus 50 and platen 52 will move into position for operation, and said stylus during such motion of the crank 23 will form one of the transverse lines 55 on the strips, said lines denoting whether the operator had properly operated the machine with respect to the quantity of gasolene ordered. The platen 52 by its pressure against the strips of paper and ribbon will effect an impression on the strips denoting the person operating the machine. Upon the completion of the sale, the end of the strip 31 will be fed through the slot 41 by means of the crank handle 87 and disk 86 as hereinbefore described and then detached from the body of the strip to constitute a check 53. The strips of paper and ribbon have an intermittent motion and they are caused to travel in space to space succession when the crank 23 is reversed to release the stylus 50 and platen 52 from the strips of paper and ribbon, as hereinbefore explained. The glass plate 36 is provided so that while the strip of paper 31 is traveling below the same, the operator of the machine, as well as the purchaser, may observe through said plate, whether or not the operator is properly operating the machine to deliver the quantity of gasolene ordered. The check 53 when delivered from the machine to the purchaser will indicate to him whether the proper quantity of gasolene ordered has been delivered, and the strip of paper 29 reeled up within the machine presents an account to the owner of the machine of the gasolene delivered to each customer.

The mechanism of my invention safeguards the owner of the machine against the unlawful use of the same and in addition identifies the various employees who may from time to time operate the machine and gives to the owner of the machine a concealed record of the sales transactions and to each customer a check indicating the salesman with which he had his dealings and a record as to whether or not he received the gasolene ordered.

I am aware that many changes in the specific mechanism shown may be made without departing from the spirit of my invention, and hence I do not limit my invention to matters of detail, form or arrangement otherwise than may be required by the appended claims.

What I claim as my invention and desire to secure by Letters Patent is:—

1. Liquid dispensing apparatus having a handle and an operating shaft for effecting the discharge, and recording mechanism operable from said handle for recording the quantity of liquid discharged at each operation comprising a strip to receive the record, means for imparting from said handle and during the reverse movement thereof after each discharge of the liquid, a longitudinal intermittent motion to said strip, a stylus for forming a transverse line on said strip denoting the quantity of liquid delivered at each discharge action of said handle, and means for effecting, from said handle, the traveling movement of said stylus transversely across said strip to make said record line while said strip is stationary and then relieving the stylus from said strip and reversing the travel of said stylus while in its inoperative position on and during the reverse action of said handle.

2. Liquid dispensing apparatus having a handle and an operating shaft for effecting the discharge, and recording mechanism operable from said handle for recording the quantity of liquid discharged at each operation comprising a strip to receive the record, means for imparting from said handle and during the reverse movement thereof after each discharge of the liquid, a longitudinal intermittent motion to said strip, a stylus for forming a transverse line on said strip denoting the quantity of liquid delivered at each discharge action of said handle, and means for effecting, from said handle, the traveling movement of said stylus transversely across said strip to make said record line while said strip is stationary and then relieving the stylus from said strip and reversing the travel of said stylus while in its inoperative position on and during the reverse action of said handle, combined with concealed means for locking the recording mechanism against operative action, and means for the use of an authorized person for freeing the said locking means, to render the said recording means operable from said handle.

3. Liquid dispensing apparatus having a handle and an operating shaft for effecting the discharge, and recording mechanism operable from said handle for recording the quantity of liquid discharged at each operation comprising a strip to receive the record, means for imparting intermittent motions to said strip, a stylus for forming a line on the strip and means for effecting the traveling movement of said stylus from said handle and in accordance with the action thereof, said line denoting the quantity of liquid delivered, combined with concealed means for locking the apparatus against discharging action, means for the use of an authorized person for freeing the locking means to render the apparatus operative and means coöperating with the recording mechanism for impressing on the strip a character identifying said person.

4. Liquid dispensing aparatus having a handle and an operating shaft for effecting the discharge, and recording mechanism operable from said handle for recording the quantity of liquid discharged at each operation, comprising a strip to receive the record, means for placing an identifying character on said strip denoting the operator, means for imparting intermittent motions to said strip, and means for effecting the traveling movement of said stylus from said handle and in accordance with the action thereof, said line denoting the quantity of gasolene or other liquid delivered.

5. Liquid dispensing apparatus having a handle and an operating shaft for effecting the discharge, and recording mechanism operable from said handle for recording the quantity of liquid discharged at each operation, comprising a strip to receive the record, means for imparting intermittent motions to said strip, means for impressing parallel longitudinal lines on said strip during its said motions, a stylus for forming a line on the strip crossing said longitudinal lines when the strip is stationary, and means for effecting the traveling movement of said stylus from said handle and in accordance with the action thereof, said line denoting the quantity of liquid delivered, and said longitudinal lines denoting by the spaces between them predetermined quantities of the liquid.

6. Liquid dispensing apparatus having a handle and an operating shaft for effecting the discharge, and recording mechanism operable from said handle for recording the quantity of liquid discharged at each operation comprising a strip to receive the record, means for imparting intermittent motions to said strip, a stylus for forming a line on the strip and means for effecting the traveling movement of said stylus from said handle and in accordance with the action thereof, said line denoting the quantity of liquid delivered, combined with concealed means for locking the apparatus against discharging action, means for the use of an authorized person for freeing the locking means to render the apparatus operative, and means within the apparatus for designating on the strip a character indicating the person who rendered the apparatus operative, said means for freeing the apparatus to operate comprising a key to be inserted into the casing and turned against the said locking means to render the same inoperative, and said means for identifying the person who inserted the key, comprising a type-carrying slidable member in the path of the key and to be positioned by it on its insertion home through the key slot, and a platen connected with the recording mechanism for pressing the strip against the particular type identifying the holder of said key.

7. Liquid dispensing apparatus having a handle and an operating shaft for effecting the discharge, and recording mechanism operable from said handle for recording the quantity of liquid discharged at each operation comprising a strip to receive the record, means for imparting intermittent motions to said strip, a stylus for forming a line on the strip and means for effecting the traveling movement of said stylus from said handle and in accordance with the action thereof, said line denoting the quantity of liquid delivered, said means for effecting the traveling movement of the stylus being a spirally grooved roller, a slidable band thereon engaged by said groove and carrying the stylus and means limiting the rotary movement of said band caused by the friction between the roller and band when said roller is set in motion.

8. Liquid dispensing apparatus having a handle and an operating shaft for effecting the discharge, and recording mechanism operable from said handle which will necessarily and certainly record the quantity of liquid discharged at each operation, comprising a strip to receive the record, rollers over which said strip is adapted to travel, a lower plate and an upper glass plate having an opening therein between which said strip travels, means for imparting intermittent motions to said strip from said handle and in accordance with the action thereof, a stylus for forming a line on the strip and means for effecting the traveling movement of said stylus from said handle and in accordance with the action thereof, said line denoting the quantity of liquid delivered.

9. Liquid dispensing apparatus having a handle and an operating shaft to effect the discharge, and recording mechanism operable from said handle for recording the quantity of liquid discharged at each operation comprising a strip to receive the record, a stylus for forming a line on the strip during each discharging action of said handle, means for effecting the traveling movement of said stylus from said handle in accordance with the action thereof from its initial position crossing the strip during the discharging action of the handle and back to its initial position during the reverse action of said handle, and means for imparting a definite onward motion to said strip during the reverse action of the handle, said means for effecting the traveling movement of the stylus also serving to lower the stylus from said strip during such reverse action of said handle.

10. Liquid dispensing apparatus having a handle and an operating shaft for effecting the discharge, recording mechanism operable from said handle for recording the quantity of liquid discharged at each operation, comprising a strip to receive the record, means for imparting intermittent motions to said strip, a stylus for forming a line on the strip denoting the quantity of liquid delivered and means for effecting the traveling movement of said stylus from said handle and in accordance with the action thereof, and rollers over which said strip travels, said means for effecting the traveling movement of the stylus being a spirally grooved roller, a slidable band thereon engaged by said groove and carrying the stylus, and means limiting the rotary movement of said band caused by the friction between the roller and band when said roller is set in motion, and said means for imparting intermittent motions to said strip being an arm on said band and operative mechanism between said arm and one of said rollers for transmitting motion to said roller when said stylus has completed its movement in one direction and said handle is turned to restore the stylus to its initial position, said band at that time being given a limited rotation from said grooved roller turning said stylus downwardly and said arm upwardly against said motion transmitting means.

11. Liquid dispensing apparatus having a handle and an operating shaft to effect the discharge, and recording mechanism operable from said handle for recording the quantity of liquid discharged at each operation comprising a strip to receive the record, a stylus for forming a line on the strip during each discharging action of said handle, means for effecting the traveling movement of said stylus from said handle in accordance with the action thereof from its initial position crossing the strip during the discharging action of the handle and back to its initial position during the reverse action of said handle, and means for imparting a definite onward motion to said strip during the reverse action of the handle, said means for effecting the traveling movement of the stylus also serving to lower the stylus from said strip during such reverse action of said handle, combined with concealed means for locking the apparatus against discharging action, means for the use of an authorized person for freeing the locking means to render the apparatus operative, and means within the apparatus for designating on the strip a character indicating the person who rendered the apparatus operative, said means for freeing the apparatus to operate comprising a key to be inserted into the casing and turned against said locking means to render the same inoperative, and said means for identifying the person who inserted the key comprising a type-carrying slidable member in the path of the key and to be positioned thereby, and a platen connected with the recording mechanism for pressing the strip against the particular type identifying the holder of said key.

12. Liquid dispensing apparatus having a handle and operating shaft to effect the discharge, and recording mechanism operable from said handle for recording the quantity of liquid discharged at each operation comprising a strip to receive the record, a spirally grooved roller having thereon a band carrying a stylus for forming a line on the strip during each discharging action of the handle and slidable by its engagement with said groove, and said band being adapted to have a partial rotary motion due to its frictional engagement with said groove, a platen carrying member frictionally engaged with said roller for impressing on the strip a character denoting the operator of the machine, means for imparting an onward movement to said strip when the stylus is stationary comprising an arm on said band, a feed roller for the strip, means intermediate said arm and roller for actuating the roller when the grooved roller is reversed in motion to lower the stylus from the strip, concealed means for locking the apparatus against operation, a type-carrying member bearing characters to denote the individual operators of the machine, and a key to be held by an authorized person for freeing said locking means and setting said type carrying member to proper position above the platen on said arm, said type carrying means bearing indicating characters corresponding with the keys held by persons possessing the same for assuring the indication on the strip of a character identifying the operator.

13. A liquid dispensing apparatus having a handle and an operating shaft to effect the discharge, and recording apparatus operable from said handle for recording the quantity of liquid discharged at each operation comprising two strips to receive the record in duplicate, means for reeling up one of said strips as a record for the owner of the apparatus, an opening for the discharge of the other strip, a transfer ribbon interposed between said strips, rollers for said strips, a plate over said strips and ribbon, a stylus to engage said strips and by means of said ribbon form a line thereon during each discharging action of said handle, means for effecting the traveling movement of said stylus from said handle in accordance with the action thereof from its initial position across the strips during the discharging action of the handle and back to its initial position free of said strips during the reverse action of said handle, and means for imparting a definite onward motion to said strips during said reverse action of the handle, whereby one of said strips becomes discharged from the machine for the use of the customer.

14. A liquid dispensing apparatus having a handle and an operating shaft to effect the discharge, and recording apparatus operable from said handle for recording the quantity of liquid discharged at each operation comprising two strips to receive the record in duplicate, means for reeling up one of said strips as a record for the owner of the apparatus, an opening for the discharge of the other strip, a transfer ribbon interposed between said strips, rollers for said strips, a plate over said strips and ribbon, a stylus to engage said strips and by means of said ribbon form a line thereon during each discharging action of said handle, means for effecting the traveling movement of said stylus from said handle in accordance with the action thereof from its initial position across the strips during the discharging action of the handle and back to its initial position free of said strips during the reverse action of said handle, means for imparting a definite onward motion to said strips during said reverse action of the handle, whereby one of said strips becomes discharged from the machine for the use of the customer, and manually operative means for discharging a further portion of said strip, when required, to create a check of predetermined length regardless of the sales recorded thereon.

15. Liquid dispensing apparatus having a handle and an operating shaft to effect the discharge, and recording mechanism operable from said handle for recording the quantity of liquid discharged at each operation comprising a strip to receive the record, a stylus for forming a line on the strip during each discharging action of said handle, means for effecting the traveling movement of said stylus from said handle in accordance with the action thereof from its initial position crossing the strip during the discharging action of the handle and back to its initial position during the reverse action of said handle, means for imparting a definite onward motion to said strip during the reverse action of the handle, said means for effecting the traveling movement of the stylus also serving to lower the stylus from said strip during such reverse action of said handle, and means for manually feeding portions of said strip, when required, to create the formation of checks of uniform length regardless of the record made thereon.

16. A liquid dispensing apparatus having a handle and an operating shaft to effect the discharge, and recording apparatus operable from said handle for recording the quantity of liquid discharged at each operation comprising two strips to receive the record in duplicate, means for reeling up one of said strips as a record for the owner of the apparatus, an opening for the discharge of the other strip, a transfer ribbon interposed between said strips, rollers for said strips, a plate over said strips and ribbon, a stylus to engage said strips and by means of said ribbon form a line thereon during each discharging action of said handle, means for effecting the traveling movement of said stylus from said handle in accordance with the action thereof from its initial position across the strips during the discharging action of the handle and back to its initial position free of said strips during the reverse action of said handle, means for imparting a definite onward motion to said strips during said reverse action of the handle, whereby one of said strips becomes discharged from the machine for the use of the customer, combined with concealed means for locking the apparatus against discharging action, and means for the use of an authorized person for freeing the locking means to render the apparatus operative.

17. A liquid dispensing apparatus having a handle and an operating shaft to effect the discharge, and recording apparatus operable from said handle for recording the quantity of liquid discharged at each operation comprising two strips to receive the record in duplicate, means for reeling up one of said strips as a record for the owner of the apparatus, an opening for the discharge of the other strip, a transfer ribbon interposed between said strips, rollers for said strips, a plate over said strips and ribbon, a stylus to engage said strips and by means of said ribbon form a line thereon during each discharging action of said handle, means for effecting the traveling movement of said stylus from said handle in accordance with the action thereof from its initial position across the strips during the discharging action of the handle and back to its initial position free of said strips during the reverse action of said handle, and means for imparting a definite onward motion to said strips during said reverse action of the handle, whereby one of said strips becomes discharged from the machine for the use of the customer, combined with concealed means for locking the apparatus against discharging action, means for the use of an authorized person for freeing the locking means to render the apparatus operative, and means coöperating with the recording mechanism for impressing on the strips a character identifying said person.

18. A liquid dispensing apparatus having a handle and an operating shaft to effect the discharge, and recording apparatus operable from said handle for recording the quantity of liquid discharged at each operation, comprising two strips to receive the record in duplicate, means for reeling up one of said strips as a record for the owner of the apparatus, an opening for the discharge of the other strip, a transfer ribbon interposed between said strips, rollers for said strips, a plate over said strips and ribbon, a stylus to engage said strips and by means of said ribbon form a line thereon during each discharging action of said handle, means for effecting the traveling movement of said stylus from said handle in accordance with the action thereof from its initial position across the strips during the discharging action of the handle and back to its initial position free of said strips during the reverse action of said handle, and means for imparting a definite onward motion to said strips during said reverse action of the handle, whereby one of said strips becomes discharged from the machine for the use of the customer, combined with concealed means for locking the apparatus against discharging action, means for the use of an authorized person for freeing the locking means to render the apparatus operative, and means within the apparatus for designating on the strips a character indicating the person who rendered the apparatus operative, said means for freeing the apparatus to operate comprising a key to be inserted into the casing of the apparatus and engage the said locking means to render the same inoperative, and said means for identifying the person who inserted the key comprising a type-carrying slidable member in the path of the key to be positioned by it on its insertion home through the key slot, and a platen connected with the recording mechanism for pressing the strips against the particular type identifying the holder of said key.

19. A liquid dispensing apparatus having a handle and an operating shaft to effect the discharge, and recording apparatus operable from said handle for recording the quantity of liquid discharged at each operation, comprising two strips to receive the record in duplicate, a transfer ribbon interposed between said strips, rollers for said strips, a plate over said strips and ribbon, a stylus to engage said strips and by means of said ribbon form a line thereon during each discharging action of said handle, means for effecting the traveling movement of said stylus from said handle in accordance with the action thereof from its initial position across the strips during the discharging action of the handle and back to its initial position free of said strips during the reverse action of said handle, and means for imparting a definite onward motion to said strips during said reverse action of the handle.

20. A liquid dispensing apparatus having a handle and an operating shaft to effect the discharge, and recording apparatus operable from said handle for recording the quantity of liquid discharged at each operation, comprising two strips to receive the record in duplicate, a transfer ribbon interposed between said strips, rollers for said strips, a plate over said strips and ribbon, a stylus to engage said strips and by means of said ribbon form a line thereon during each discharging action of said handle, means for effecting the traveling movement of said stylus from said handle in accordance with the action thereof from its initial position across the strips during the discharging action of the handle and back to its initial position free of said strips during the reverse action of said handle, and means for imparting a definite onward motion to said strips during said reverse action of the handle, the outer record strip being of transparent paper and said plate over said strips being transparent.

21. In liquid dispensing apparatus, the combination with discharge mechanism operative by the movement of one of its parts in one direction to positively effect the discharge of a quantity of liquid proportional to the extent of such movement of recording mechanism so automatically actuated from the discharge mechanism as to necessarily and distinctly record the beginning, end, and extent of each discharge movement of the discharge mechanism.

22. In liquid dispensing apparatus, the combination of discharge mechanism operative by the movement of one of its parts in one direction to positively effect the discharge of a quantity of liquid proportional to the extent of such movement and inoperative to effect a discharge of liquid on the movement of said part in the reverse direction of recording mechanism which is operatively controlled by the discharge mechanism and comprises a record strip and means operative on each discharge movement of the discharge mechanism for forming on the record strip a line indicating thereon the beginning, end, and extent of such movement and on each reverse movement of the discharge mechanism for intermittently feeding forward the record strip.

23. In liquid dispensing apparatus, the combination with a discharge mechanism operative by the movement of one of its parts in one direction to positively effect the discharge of a quantity of liquid proportional to the extent of such movement of recording mechanism adapted to automatically record to scale the beginning, end, and extent of each discharge movement of the discharge mechanism, locking means adapted normally to lock the discharge mechanism against a discharge movement, and unlocking means adapted to release the discharge mechanism from the locking means only when holding an identifying mark in operative relationship with the recording mechanism.

24. In liquid dispensing apparatus, the combination with discharge mechanism operative by the movement of one of its parts in one direction to positively effect the discharge of a quantity of liquid proportional to the extent of such movement and inoperative to effect the discharge of liquid on the movement of the said part in the reverse direction of recording mechanism operatively controlled by the discharge mechanism and comprising a record strip and means operative on each discharge movement of the discharge mechanism for forming on the record strip a line indicating the beginning, end, and extent of such movement and on each reverse movement of the discharge mechanism for intermittently feeding forward the record strip, locking means operative normally to lock the discharge mechanism against the discharge movement, and unlocking means operative to release the discharge mechanism from the locking means only when holding an identifying mark in operative relationship with the recording mechanism.

25. In combination, a pump and recording mechanism operatively controlled by movable parts of the pump, which recording mechanism comprises a record strip, means operative on a discharge movement of the pump for forming upon the record strip a transverse line indicating the beginning, extent, and end of such discharge movement, and means for certainly feeding the record strip forward after each and before the next discharge movement of the pump wherever such discharge movement may begin and end.

26. In combination, a pump and recording mechanism therefor which comprises a record strip, means operative on each discharge movement of the pump for forming on the record strip a transverse line indicating with reference to longitudinal scale lines thereon the beginning, end, and extent of each discharge movement of the pump, and means operative on each reverse movement of the pump for intermittently feeding forward the record strip.

27. In combination, a pump, recording mechanism operatively controlled and actuated by movable parts of the pump, a lock for the pump, a member movably mounted adjacent the recording mechanism carrying a plurality of identifying marks, a plurality of keys adapted to unlock the pump and in so doing to move the movable member each time to a different extent to bring a different identifying mark into operative relationship with the recording mechanism.

28. In combination, a pump, recording mechanism operatively controlled by movable parts of the pump and adapted to record the extent of each discharge movement thereof, a lock for the pump, means rendered operative by the unlocking of the pump and remaining operative so long as the pump remains unlocked for recording an identifying mark on each discharge movement of the pump.

29. In combination, an oscillatory operating shaft and recording mechanism including a record strip and a stylus both operatively controlled by the shaft and so actuated therefrom as to necessarily record the beginning, end, and extent of each rotary movement of the shaft in one direction.

30. In combination, an oscillatory operating shaft and recording mechanism including two record strips, a inking ribbon, and a stylus all operatively controlled by the shaft and so actuated therefrom as to necessarily record in duplicate the beginning, end, and extent of each rotary movement of the shaft in one direction.

31. In combination, an oscillatory operating shaft and recording mechanism controlled thereby which comprises a record strip, means operative only during the rotation of the shaft in one direction for feeding forward the record strip and forming thereon longitudinal scale lines, and means operative only during the rotation of the shaft in the reverse direction for forming on the record strip transverse lines indicating with reference to the longitudinal scale lines thereon the beginning, end, and extent of such reverse movement of the shaft.

32. In combination, an oscillatory operating shaft, a casing inclosing a portion of the shaft, recording mechanism mounted within the casing in operative connection with the shaft and adapted to record the extent of each movement of the shaft in one direction, a lock for the shaft mounted within the casing, and means for unlocking the shaft from outside the casing on moving an identifying character mounted within the casing into operative relationship with the recording mechanism.

33. In combination, an oscillatory operating shaft, a casing inclosing a part of the shaft, and mounted within the casing recording mechanism which comprises duplicate record strips, means operative on each rotary movement of the shaft in one direction for forming on both strips a line indicating the extent of such rotary movement of the shaft, and means operative on each rotary movement of the shaft in a reverse direction for intermittently feeding forward both strips and discharging one strip outside the casing.

34. In combination, an oscillatory operating shaft, a casing inclosing a part of the shaft, and mounted within the casing recording mechanism which comprises duplicate record strips, means operative on each rotary movement of the shaft in one direction for forming on both duplicate strips a transverse line indicating the extent of such rotary movement, and means operative on each rotary movement of the shaft in the reverse direction for intermittently feeding forward the duplicate record strips and delivering one outside the casing.

35. In combination, a pump, a casing having a portion of one of its walls of transparent material attached to the pump, recording mechanism mounted within the casing in operative connection with a movable part of the pump and actuated therefrom to necessarily record opposite the transparent portion of the wall of the casing the extent of each movement of the pump.

36. In combination, a pump, a casing having a portion of one of its walls of transparent material inclosing a portion of one of the movable parts of the pump, and mounted within the casing recording mechanism which comprises a record strip adapted to be moved along within the casing past and in close proximity to the transparent portion of its wall, means operative from the movable portion of the pump within the casing for forming on the record strip opposite the transparent portion of the wall of the casing a line indicating the extent of each discharge movement of the pump, and means also operative from the movable part of the pump within the casing for feeding forward the record strip on each reverse movement of the pump.

37. In combination, a pump, a casing inclosing a portion of one of the movable parts of the pump, and mounted within the casing recording mechanism which comprises duplicate record strips and an intermediate inking ribbon, means operative from the movable portion of the pump within the casing for pressing both record strips against the inking ribbon to form lines indicating the extent of each discharge movement of the pump, and means also operative from the movable part of the pump within the casing for feeding forward both record strips and discharging one strip outside the casing on each reverse movement of the pump.

38. In combination, a pump, a casing inclosing a portion of one of the movable parts of the pump, and mounted within the casing recording mechanism which comprises duplicate record strips and an intermediate endless inking ribbon, a stylus, means operative from the movable portion of the pump within the casing for so moving the stylus on each discharge movement of the pump as to cause it to press both record strips against the inking ribbon along a line of length proportional to the extent of such discharge movement, and means operative from the movable portion of the pump within the casing on each reverse movement of the pump for feeding forward both record strips and the inking ribbon and rolling up one record strip within and discharging the other record strip outside the casing.

39. In combination, an oscillatory operating shaft, a casing inclosing a part of the shaft, and mounted within the casing recording mechanism which comprises duplicate record strips and between them an endless inking ribbon, a stylus, means operative on each rotary movement of the shaft in one direction for moving the stylus in contact with one record strip to an extent proportional to such rotary movement of the shaft, and means operative on each rotary movement of the shaft in the reverse direction for intermittently feeding forward both record strips and the inking ribbon and discharging one strip outside the casing.

40. In combination, an oscillatory operating shaft, a casing inclosing a part of the shaft, and mounted within the casing recording mechanism which comprises duplicate record strips and between them an endless inking ribbon, means operative on each rotary movement of the shaft in one direction for moving the stylus in contact with one record strip to an extent proportional to the extent of such rotary movement of the shaft, and means operative on each rotary movement of the shaft in the reverse direction for intermittently feeding forward both record strips and the inking ribbon and rolling up one record strip within and discharging the other record strip outside the casing.

41. In combination, an oscillatory operating shaft and recording mechanism controlled thereby which comprises a record strip, means operative only during the rotation of the shaft in one direction for feeding forward the record strip to an extent proportional to the extent of the angular movement of the shaft, and means operative only during the rotation of the shaft in the reverse direction for forming on the record strip transverse lines showing the beginning, end, and extent of such reverse angular movement of the shaft.

CHARLES S. BATDORF.